Dec. 26, 1939.  R. V. MORSE  2,184,395
POWER TRANSMISSION
Filed June 15, 1937  2 Sheets-Sheet 1

INVENTOR.
Robert V. Morse

Dec. 26, 1939.   R. V. MORSE   2,184,395
POWER TRANSMISSION
Filed June 15, 1937   2 Sheets-Sheet 2

INVENTOR.
Robert V. Morse

Patented Dec. 26, 1939

2,184,395

UNITED STATES PATENT OFFICE 2,184,395

POWER TRANSMISSION

Robert V. Morse, Ithaca, N. Y.

Application June 15, 1937, Serial No. 148,264

5 Claims. (Cl. 74—219)

This invention relates to mechanical methods for transmitting power between driving and driven shafts with a predetermined constant speed ratio; it concerns the field of power transmission generally covered by gearing, chain drives, and belts. Gearing, in the sense of intermeshing toothed wheels, has been the most common form, particularly where a certain fixed ratio of rotative speeds was required between the driving and driven shafts. Such gearing could be designed to smoothly transmit uniform rotation from one shaft to another, with a fixed ratio of rotation; but due to wear in practice it tends to lose its theoretical characteristics and become noisy. Chain drives also have the quality of transmitting power with a fixed speed ratio between the driving and driven shafts, and in the form known as "silent" chain drives, in which the chain automatically compensates for elongation due to wear by riding higher on wedge-shaped sprocket teeth, the chains retain the same precise engagement with the sprocket teeth until they are worn out, so that such chain drives are as quiet in the latter days of their life as when new. However, they are not perfectly silent, and under various conditions of load and tension occasionally show excessive vibration. This is due to the fact that a chain drive, unlike a gear, cannot take a uniform rotative velocity from one shaft and transmit an absolutely uniform rotative velocity to another shaft. We are here not considering speed ratios, in the sense of how many turns a driving shaft makes for one rotation of the driven,—such ratios are fixed in chain drives as in spur gears; but in the matter of uniformity of circumferential velocity at different stages of a single rotation, chain drives do not have the uniformity that characterizes gears. This is due to the fact that a sprocket tooth engages a chain link before it becomes tangential, so that a chain runs on or off a sprocket in a series of slight bumps, somewhat as a belt would running on a polygonal wheel having as many flat sides as there are teeth on a sprocket.

While toothed gearing and chain drives have their limitations of wear, noise, or vibration, smooth flexible belts, such as ordinary leather belts and V belts, are quiet and practical for many purposes, but have never been considered capable of supplanting gears or chain drives where fixed rotative ratios were essential in the machine being operated. This was due to the factor of stretch or creep which was always present in belt drives where the contact between the belt and pulley was merely the frictional engagement of smooth surfaces.

The purpose of the present invention is to obtain the advantages of the three types above mentioned without their disadvantages; that is, to mechanically transmit power with the smoothness and quietness of belting, and with the positiveness and constant speed ratio characteristic of gearing or chain drives.

I obtain this by setting up a master train which transmits the precise rotative ratio, but does not carry the load, so as to run quietly with little wear; and in combination therewith a controlled belt drive to smoothly carry the load, said belt drive being constantly regulated by the master train to maintain the fixed ratio of rotation desired. In other words, the creep, stretch, and wear of the belt are automatically compensated, so that belts can be installed in fixed ratio drives where chains or gears were heretofore considered necessary.

While a master train is necessarily involved in the combination, I have also discovered that in some machines, such as an engine valve gear, for example, the master or control train need not be an additional item of expense, as other accessory shafts, which happen to be positively driven by the engine for other purposes, may also be used to control the belt drive.

Other objects of the invention are to reduce the most of mechanically transmitting fixed rotative ratios; to make the elements which so transmit the load more accessible and easily changed or repaired; and to do away with the lubrication previously required for the load transmitting elements. Various other objects will become apparent as the description proceeds.

Referring now to the drawings forming part of this specification,

Figure 3 shows the invention applied to the cam shaft drive of an internal combustion engine, and with gearing instead of a chain as the regulating control train.

Figure 4 is a view partially in cross section on the line 4—4 of Figure 3.

Similar reference numerals refer to similar parts throughout the various views.

Figure 1:
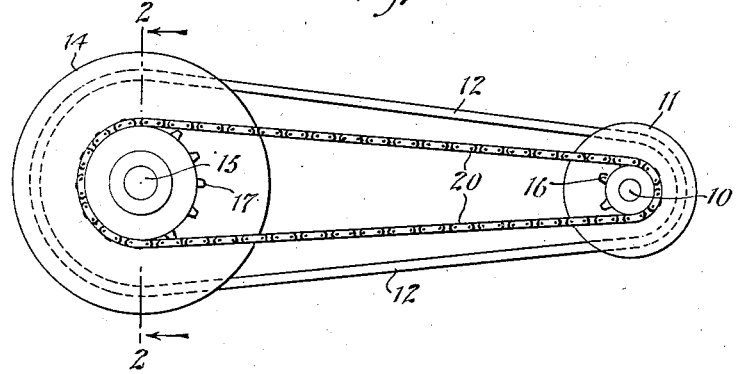
Figure 1 illustrates one simple form of the invention as applied to two pulleys.

Referring now to Figure 1, the shaft 10 (which may be either the driver or driven, but for purposes of illustration will be here termed the driver), has mounted thereon a V pulley 11 capable of engaging an ordinary V belt 12. The V belt 12 also extends around the V pulley 14 which is of the adjustable type, and which is mounted on the shaft 15. Also mounted on the shaft 10 and on the pulley 14 are the sprockets 16 and 17 respectively, these sprockets 16 and 17 being connected by the chain 20, so that a fixed drive ratio is maintained between the sprockets 16 and 17. The manner in which this fixed ratio is applied to maintain an equivalent fixed ratio in the V belt drive is shown more in detail in Figure 2, in one illustrative form.

Figure 2:
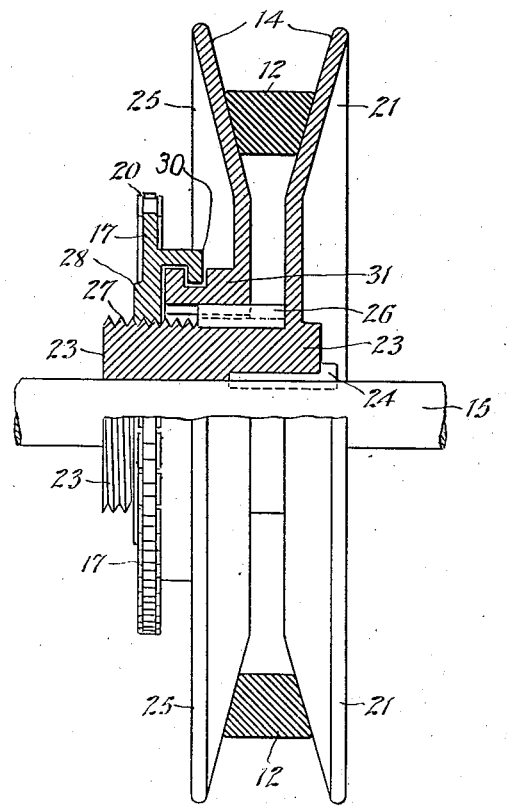
Figure 2 is a partial cross-section on the line 2—2 of Figure 1, showing one form of regulating mechanism with chain drive control.

In Figure 2 the reference numeral 14 indicates in general an adjustable V pulley whose flange 21 has a hub 23 keyed at 24 to the shaft 15. The hub 23 also carries the adjustable flange 25 mounted with a feather key 26 so that the flange 25 may move axially relative to the flange 21 but must rotate therewith. The hub 23 is provided with an external thread 27 which meshes with an internal thread in the hub 28 of the sprocket 17. The sprocket 17 is connected by the collar 30 to the hub 31 of the flange 25, so that the sprocket 17 by screwing on the thread 27 may move the flange 25 axially relative to the flange 21, while at the same time the flange 25 remains free to rotate relative to the sprocket 17.

The effective running diameter, or running position of the V belt 12 in the pulley 14 is regulated by any turning of the sprocket 17 relative to the pulley 14, which screws the sprocket 17 on the thread 27 and moves the flange 25 axially relative to the flange 21, thus drawing the flanges 21 and 25 nearer together to cause the belt 12 to ride further out on the pulley, or spreading the flanges 21 and 25 farther apart so as to allow the belt 12 to run closer to the shaft 15 on a smaller effective diameter.

Variable diameter pulleys are old in the art in various forms in variable speed transmissions, where their setting is controlled by some external means, generally manually operated, to give a variety of driving ratios. Any suitable form of variable pulley may be used in the present invention, which is primarily concerned with the means and method by which pulleys are regulated to maintain a fixed ratio; and the form shown in Figure 2 is merely illustrative of one embodiment.

The sprocket 17 is driven by the chain 20 from the sprocket 16 on the shaft 10. It will be noted that this chain drive is one form of fixed ratio gearing, and therefore the sprocket 17 rotates a definite number of revolutions for each definite number of revolutions of the sprocket 16.

Now it will be seen that if the belt 12 tends to turn the pulley 14 faster than the chain 20 turns the sprocket 17, the flanges 21 and 25 are adjusted relative to each other, and by properly proportioning the thread 27 the V belt 12 may be made to ride outward when the pulley 14 is turning too fast, and ride inward when the pulley 14 is turning too slowly. This will cause the pulley 14 to speed up if it is turning more slowly than the sprocket 17, or conversely will slow down the pulley 14 if it is turning faster than the sprocket 17; and thus maintain the speed ratio of the V belt drive precisely as determined by the chain or gear drive. When the speed ratio between the pulleys of the V belt drive continues the same as that of the regulatory chain or gear drive, the chain or gear drive no longer has to regulate, but merely runs in parallel at a synchronous speed.

Taking up the corrective action more in detail, it will be noted that the corrective or regulatory action is not merely a function of the lead or lag of the sprocket speed at any one instant. The action is also a function of the speed of rotation of the pulley, each rotation of the pulley for a given difference in speed which would adjust the flange 25 an amount $a$ in one revolution would adjust it an amount $5a$ in five revolutions, if the difference persisted. With a pulley running, say, 1200 R. P. M., or twenty revolutions per second, it will be seen that a practically instantaneous correction is insured and that the system will persistently and powerfully seek the precise ratio corresponding to the master control train.

In Figure 3 the system is shown applied to the cam shaft drive of an internal combustion engine 40. In multi-cylinder engines especially a considerable amount of power is required to operate the cam shaft that actuates the numerous valves, and rather large chains or gears are usually employed for that purpose, which become a source of noise and trouble, and require constant lubrication. In Figure 3 the V belt pulley 11' is keyed to the crankshaft 10' of the engine 40, and the adjustable V belt pulley 14' is keyed to the cam shaft 15'. The ordinary V belt 12' runs over the pulleys 11' and 15' and also over the fan pulley 41, which is usually provided with a customary tensioning device 42 to maintain a suitable belt tension.

The means employed to regulate and maintain constant the speed ratio and angular relation between the pulley 11' on the crankshaft and the pulley 14' on the cam shaft is similar in general to that described in reference to Figure 1 and Figure 2, but instead of a chain drive 20 a gear drive is illustrated as shown in Fig. 3 and Fig. 4. This gear drive consists of a pair of spiral gears 45 driving the shaft 46 from the crankshaft 10', and another pair of spiral gears 47 driven by the shaft 46 and driving the pitch control element 17' of the adjustable pulley 14', which control element corresponds to the sprocket 17 of the pulley 14 in Figure 2. The pitch and tooth angle of the gears 45 and 47 are proportioned to give the desired ratio between the crankshaft and cam shaft.

Similar gearing, or gearing in any suitable form, may be used as the master train between the points to be regulated. The use of any form of gearing or chain drive as the regulator usually means an additional element in the belt drive system. However, in engines and other machines where light accessory shafts are driven at any fixed ratio to the main shaft, these accessory shafts, required for another purpose, can generally be utilized to also drive the belt regulating gear. This permits the belt drive to be substantially as simple as the chain or gear drives of the prior art, and much cheaper to install and maintain. For example, in Figure 3, the shaft 46 is also the ignition timing shaft running the distributor 50—a comparatively lightly loaded element involving little expense; this would correspond to the injection timing shaft in a Diesel.

For the tensioning of the belt, any suitable tensioning device 42 such as is customary in the art may be used, but it will be noted that unlike the variable V belt drives, which require wide and simultaneous adjustment of center distances with pulley diameters in order to operate, the present invention, being directed to maintenance of a single speed ratio, does not require such elaborate devices. Tensioning devices suitable for fixed or non-adjustable pulleys will generally suffice, though more elaborate forms may be used.

While I have shown the belt running over two pulleys in Figure 1 and three pulleys in Figure 3, it will be understood of course that a belt may run over any number of pulleys. For example, in some automotive engines a V belt already handles the fan, water pump, and generator, and the same belt, or a companion one, could also handle the cam shaft. Any one or more of the pulleys may be regulated in exact ratio by the present invention, or some may be left unregulated. The possibility of regulating more than one pulley running off the same belt will be evident from the fact that under the present invention different ratios of regulation may be applied to each driven wheel independently, and they will correct themselves differently, each according to its own needs regardless of the variations in belt speed.

In general it may be said that the invention covers a frictional V belt drive which normally would creep having in parallel therewith a regulatory or controlling drive of fixed ratio, the V belt drive carrying the heavy load and the control drive determining the ratio of both but carrying the relatively light regulatory load. Thus it becomes possible to extend the use of V belts into fields previously monopolized by toothed mechanisms such as chains or gears, where the precise transmission of fixed rotative ratios was the determining factor.

The term "parallel" will be understood by engineers as used not necessarily in the geometric sense, but in the broader sense of having the same beginnings and ends of trains of action, as used for example in electricity, hydraulics, and in ordinary speech in relation to general courses of procedure.

While I have in the foregoing described certain specific examples, it will be understood that they are merely for purposes of illustration, to make clear the principles of the invention, which is not limited to the particular forms shown, but is susceptible to various modifications and adaptations in different installations as will be apparent to those skilled in the art, without departing from the scope of the invention as stated in the following claims.

I claim:

1. In a power transmission, the combination of a variable V belt drive, a constant ratio drive, and means operated by the difference in speed between the V belt drive and the constant ratio drive to maintain the V belt drive in substantial synchronism with the constant ratio drive, whereby power may be transmitted by the V belt drive at a fixed speed ratio.

2. In a power transmission, the combination of a variable V belt drive adapted to carry the load, a control transmitting mechanism in parallel therewith and having a fixed ratio between the driving and driven speeds, and means operated by the difference in speed between the load carrying V belt drive and the fixed ratio control mechanism to maintain the V belt drive at the same running ratio as the control mechanism, whereby power may be transmitted by the V belt drive at a fixed speed ratio.

3. In a power transmission, the combination of a driving shaft, a driven shaft, a variable V belt drive between said shafts to carry the main load, an auxiliary mechanical drive of fixed ratio between said shafts, and means operated by said auxiliary drive to maintain the load carrying V belt drive at the same fixed ratio.

4. In a power transmission, the combination of a driving shaft, a driven shaft to be operated at a fixed ratio thereto, a variable V belt drive arranged to carry the main load between said shafts, an accessory having a fixed ratio of speed relative to the driving shaft, a mechanical drive of fixed ratio between said driving shaft and said accessory, and means also operated by said mechanical drive for controlling the V belt drive to maintain the V belt drive at a fixed ratio.

5. In a power transmission, the combination of a driving shaft, a driven shaft, a variable V belt drive between said shafts, a toothed mechanical drive of fixed ratio between said shafts, and means for automatically adjusting the V belt drive ratio to accord with the toothed drive ratio, whereby the main load is carried by the frictional V belt drive at a continuously controlled fixed ratio of speed determined by the ratio of the toothed mechanical drive.

ROBERT V. MORSE.